Nov. 30, 1965   R. GOTTSCHALD ETAL   3,220,755
BALL JOINTS
Filed June 22, 1961

United States Patent Office 3,220,755
Patented Nov. 30, 1965

3,220,755
BALL JOINTS
Rudolf Gottschald, Osterrath, and Andreas Schmidt, Osterrath-Bovert, Germany, assignors to A. Ehrenreich & Cie.
Filed June 22, 1961, Ser. No. 118,953
Claims priority, application Germany June 25, 1960, E 19,524; Dec. 9, 1960, E 14,718
6 Claims. (Cl. 287—87)

This invention relates to ball and socket joints in which the socket has a lining of yielding elastic material which has a surface in contact with the ball extending on both sides of the equator of the ball and which has meridional slits on one side of the equator which form resilient tongues between them.

According to the present invention in such a joint, pressure means are provided in the socket, to press the tongues against the ball, the pressure means acting on the face of the slit part of the lining remote from the ball.

In this way the lining of the joint is made self-adjusting and also by adjusting the pressure means the resistance to movement of the joint may be adjusted to suit the requirements at any time.

This adjustment is very desirable in, for example, joints which are used on the front axles of motor vehicles, such as track rod joints which have to be adjustable to provide a certain amount of stiffness in order to prevent the front wheels from wobbling. The necessary degree of stiffness depends on the type of vehicle and its use and must therefore be variable.

The pressure means holds the tongues in continuous contact with the ball so that the ball head always rests in the unslit part of the bearing lining and is free from play in both an axial and a radial direction, and the bearing lining itself is always free from play in the socket.

The pressure means may include a wedge having an inclined surface bearing against the face of the slit part of the bearing lining remote from the ball head, and its other wedge surface bearing against the inner surface of the socket. In this case, the wedge consists of a closed or split ring or of separate ring segments. Preferably, the face of the slit part of the bearing lining which is remote from the ball is inclined parallel to the adjacent surface of the wedge and the surface of the wedge remote from the bearing lining is cylindrical and conforms to a cylindrical bore of the socket.

The wedge is preferably spring-loaded into engagement with the bearing lining.

When the slit part of the lining is at the end of the socket remote from that through which the ball pin enters, the spring loading may be provided by a plate or corrugated spring arranged between the wedge ring and a closure member for the socket.

For ease of adjusting the stiffness of the joint, the slit part of the lining is preferably situated at the end of the socket from which the ball pin emerges and the pressure means of wedge-shaped cross-section is retained by an interior shoulder in the socket between the inner wall of the socket and the face of the slit part of the bearing lining remote from the ball head. By suitable choice of the angle and dimensions of the wedge, the degree of stiffness can be varied without altering the other parts of the joint.

A number of examples of a ball and socket joint constructed in accordance with the present invention are illustrated in the accompanying drawings, in which.

In all the forms of construction, the ball and socket joint consists of a ball pin 1 having a ball 2 and a socket 3. The ball 2 is mounted in a bearing lining 4 of resilient material, in the socket.

Figure 1:
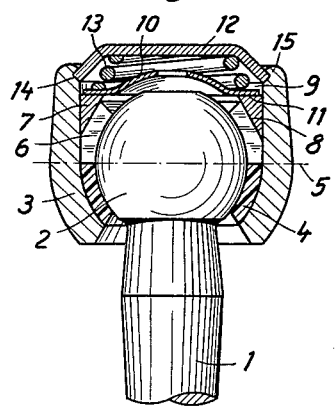
FIGURE 1 is a vertical section through a ball and socket joint in which the slit part of the bearing lining is situated at the end of the socket remote from that through which the ball pin enters.
Figure 2:
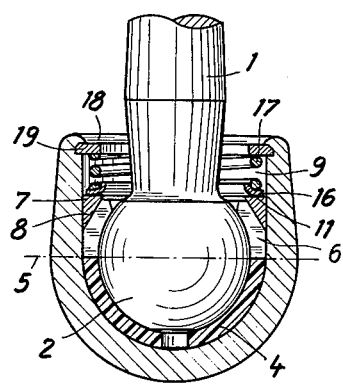
FIGURE 2 is a vertical section through another joint in which the slit part of the bearing lining is situated at the end through which the ball pin emerges.
Figure 5:
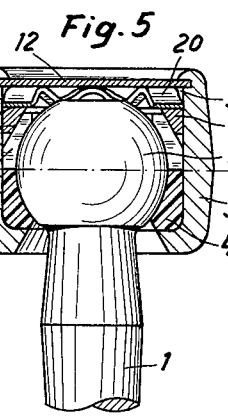
FIGURE 5 is a vertical section through another joint in which the wedge ring is spring loaded by a spring which is formed by a corrugated disc.
Figure 6:
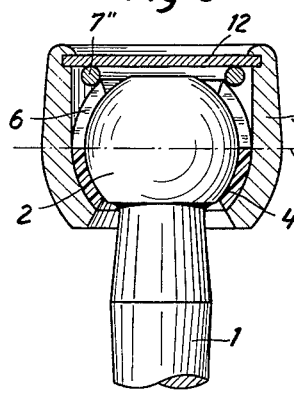
FIGURE 6 is a vertical section through another joint in which a spring ring is provided as pressure means.
Figure 7:
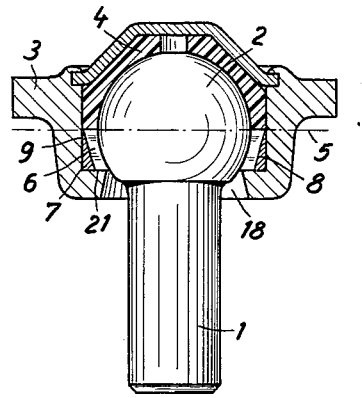
FIGURE 7 is a vertical section through another joint which is similar to that shown in FIGURE 2.

In the constructions shown in FIGURES 1, 5 and 6 the lining 4 in the socket is situated at the end through which the pin 1 emerges from the socket, whereas in the constructions shown in FIGURES 2 and 7 it is situated at the other end of the socket. The lining lies in contact with the ball and extends beyond the equator 5 of the ball. Meridional slits 6 are provided in the part of the lining which extends beyond the equator so that resilient tongues are formed on that side of the equator. These tongues are pressed against the ball head by a pressure means both in the axial direction of the joint pin 1 and also in the radial direction of the ball.

In FIGURES 1, 2, 5 and 7 the pressure means 7 is wedge shaped. A wedge surface 8 bears against the tongues which are formed between the slits. The faces of the tongues remote from the ball head and in contact with the wedge surface are parallel to the adjacent wedge surface 8. The outer wedge surface 7 is cylindrical and fits into the bore 9 of the socket.

Figure 3:
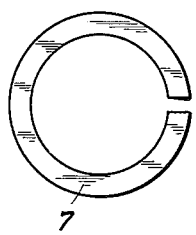
FIGURE 3 shows a split wedge ring in plan.
Figure 4:
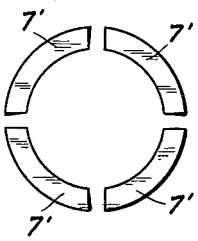
FIGURE 4 shows a plan of a wedge ring consisting of a number of segments.

The pressure means 7 may be in the form of a split, wedge ring as shown in FIGURE 3 or alternatively it may be composed of separate wedge-shaped ring segments 7', as shown in FIGURE 4.

The pressure means 7 is acted upon by a spring which tends to push the pressure means against the bearing lining.

As shown in FIGURE 1, the edge of a plate 10 rests on the face 11 of the ring 7. A coiled spring 13 is arranged between the plate 10 and the cover 12 which closes the socket. The spring 13 is supported on the edge of the plate 10 and bears against a flat part of the cover 12. The cover 12 rests on an internal shoulder 14 in the socket and is fixed by means of a bead 15 which is rolled over it.

In FIGURE 2, the edge of an annular disc 16 rests on the face 11 of the wedge ring 7 and a coiled spring 17 is supported on the disc. The other supporting surface for the coiled spring 17 is formed by a ring 19 which is situated in the opening 18 of the socket and is rolled into the wall of the socket.

In the joint shown in FIGURE 5 the spring consists of a disc 20 having corrugations the crests of which extend circumferentially. The disc bears against the face 11 of the wedge ring 7 and also against the cover of the socket, which consists of a flat disc 12.

In the construction shown in FIGURE 6 a split spring ring 7" is provided as the pressure means and surrounds the ends of the tongues formed by the slits and presses them against the ball head. The spring ring 7" is arranged between the flat cover disc 12 and the bearing lining 4.

FIGURE 7 shows a construction in which the pressure means is in the form of a wedge ring and rests on an internal shoulder 21 of the socket adjacent to the opening 18 for the joint pin 1. The length, width and inclination of the wedge ring can be varied in order to vary the pressure which is to be exerted, so that the stiffness of the joint can be altered. The wedge ring can consist of steel or other suitable material, such as a hard synthetic material.

We claim:

1. A ball and socket joint comprising a ball pin, a ball member at the end of the ball pin, a socket for receiving the ball member and having an open end, an elastically resilient lining disposed between the ball member and the inner wall of said socket, said lining having a substantially spherical form adapted to lie closely against the ball member and extending on each side of its equator line, said lining having slits starting from one end thereof adjacent the open end of said socket to form individual resilient tongues directed axially of the ball pin and extending at least to the equator line, said tongues having an outwardly inclined surface portion starting from said one end and terminating before the equator line of said ball member to form a space between said inclined surface portion of said tongues and the inner wall of said socket, wedge means disposed slidably in said space between said inner wall of said socket and the inclined surface of said resilient tongues, said wedge means having a cylindrical circumferential surface, an inner flat surface for engaging said inclined surface portion of said tongues and an end surface facing the open end of said socket, closure means fixed to said socket at said open end thereof, and biasing means disposed between said closure means and said end surface of said wedge means to exert pressure against said surface portion of said tongues.

2. A ball and socket joint according to claim 1, wherein said biasing means comprise a spring member engaging said closure means and a plate member disposed between said spring member and said end surface of said wedge means.

3. A ball and socket joint according to claim 1, wherein said biasing means is a corrugated plate spring engaged between said closure means and the end surface of said wedge means.

4. A ball and socket joint according to claim 1, wherein said wedge means is in the form of a split ring.

5. A ball and socket joint according to claim 1, wherein said wedge means consists of a plurality of ring segments.

6. A ball and socket joint according to claim 2, wherein said spring member is a compression spring engaged between said closure means and the edge portion of said plate member.

References Cited by the Examiner

UNITED STATES PATENTS

| 1,985,728 | 12/1934 | Ingersoll. |
| 2,426,358 | 8/1947 | Klages et al. _____ 287—87 |
| 2,527,787 | 10/1950 | Berger. |

FOREIGN PATENTS

| 1,244,082 | 9/1960 | France. |
| 582,421 | 8/1933 | Germany. |
| 1,014,441 | 8/1957 | Germany. |
| 725,724 | 3/1955 | Great Britain. |

CARL W. TOMLIN, *Primary Examiner.*

WALTER A. SCHEEL, *Examiner.*